(12) United States Patent
Wies et al.

(10) Patent No.: US 7,493,365 B2
(45) Date of Patent: *Feb. 17, 2009

(54) CHAT INTERFACE WITH HAPTIC FEEDBACK FUNCTIONALITY

(75) Inventors: Evan F. Wies, Mountain View, CA (US);
Dean C. Chang, Santa Clara, CA (US);
Michael P. Ruf, Parkland, FL (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/545,739

(22) Filed: Oct. 10, 2006

(65) Prior Publication Data

US 2007/0033259 A1 Feb. 8, 2007

Related U.S. Application Data

(63) Continuation of application No. 09/608,129, filed on Jun. 30, 2000, now Pat. No. 7,159,008.

(51) Int. Cl.
*G06F 15/16* (2006.01)
(52) U.S. Cl. .......................................... 709/204; 705/9
(58) Field of Classification Search ................. 709/204; 345/701; 705/9
See application file for complete search history.

(56) References Cited

U.S. PATENT DOCUMENTS 4,938,483 A 7/1990 Yavetz 5,690,582 A 11/1997 Ulrich et al.
(Continued)

FOREIGN PATENT DOCUMENTS

EP 0 326 439 B1 8/1993

(Continued)

OTHER PUBLICATIONS

IEEE International Conference on Robotics and Automation, May 16-20, 1998, Lueven, Belgium, 41 pages.

(Continued)

*Primary Examiner*—Thong H Vu
(74) *Attorney, Agent, or Firm*—Kilpatrick Stockton LLP

(57) ABSTRACT

A chat interface allowing a user to exchange haptic chat messages with other users in a chat session over a computer network. A chat interface can be displayed by a local computer and receives input data from a user of the local computer, such as text characters or speech input. The input data provides an outgoing chat message that can include sent force information. The outgoing chat message is sent to a remote computer that is connected to the local host computer via a computer network. The remote computer can display a chat interface and output a haptic sensation to a user of the remote computer based at least in part on the force information in the outgoing chat message. An incoming message from the remote computer can also be received at the chat interface, which may also include received force information. The incoming chat message is displayed on a display device to the user of the local computer. A haptic sensation can be output to the user of the local computer using a haptic device coupled to the local computer, where the haptic sensation is based at least in part on the received force information received from the remote computer.

16 Claims, 7 Drawing Sheets

U.S. PATENT DOCUMENTS

| | | | |
|---|---|---|---|
| 5,695,400 A | 12/1997 | Fennell, Jr. et al. | |
| 5,764,916 A | 6/1998 | Busey et al. | |
| 5,884,029 A | 3/1999 | Brush, II et al. | |
| 5,956,484 A | 9/1999 | Rosenberg et al. | |
| 6,047,356 A | 4/2000 | Anderson et al. | |
| 6,101,530 A | 8/2000 | Rosenberg et al. | |
| 6,166,732 A | 12/2000 | Mitchell et al. | |
| 6,496,200 B1 * | 12/2002 | Snibbe et al. | 715/701 |
| 6,658,010 B1 * | 12/2003 | Enns et al. | 370/401 |
| 6,763,371 B1 * | 7/2004 | Jandel | 709/204 |
| 6,965,868 B1 * | 11/2005 | Bednarek | 705/9 |
| 7,084,867 B1 * | 8/2006 | Ho et al. | 345/419 |
| 7,222,228 B1 * | 5/2007 | Stephens et al. | 713/1 |

FOREIGN PATENT DOCUMENTS

| | | | |
|---|---|---|---|
| EP | 0 655 301 B1 | 6/1998 | |
| GB | 2 235 310 A | 2/1991 | |
| GB | 2 325 766 A | 12/1998 | |
| WO | WO 94/25923 | 11/1994 | |
| WO | WO 91/02313 | 2/1999 | |

OTHER PUBLICATIONS

Wloka, M, Interacting with Virtual Reality, Science and Technology Center for Computer Graphics and Scientific Visualization, Brown University Site, Department of Computer Science, Brown University, 1995, 14 pages.

Yamakita, M. et al., Tele-Virtual Reality of Dynamic Mechanical Model, Proceedings of the 1992 IEEE/RSJ International Conference on Intelligent Robots and Systems, Raleigh, NC Jul. 7-10, 1992.

* cited by examiner

CHAT INTERFACE WITH HAPTIC FEEDBACK FUNCTIONALITY

CROSS-REFERENCES TO RELATED APPLICATION

This application is a continuation of U.S. patent application Ser. No. 09/608,126 entitled "Chat Interface with Haptic Feedback Functionality" filed Jun. 30, 2000, now U.S. Pat. No. 7,159,008 the entirety of which is hereby incorporated by reference.

BACKGROUND OF THE INVENTION

The present invention relates generally to interface devices for allowing humans to interface with computer systems, and more particularly to computer interface devices that provide input from the user to computer systems and implement force feedback to the user.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, stylus, tablet, pressure-sensitive ball, or the like, that is connected to the computer system controlling the displayed environment. Typically, the computer updates the environment in response to the user's manipulation of a user-manipulatable physical object such as a joystick handle or mouse, and provides visual and audio feedback to the user utilizing the display screen and audio speakers. The computer senses the user's manipulation of the user object through sensors provided on the interface device that send locative signals to the computer.

In some interface devices, haptic feedback is also provided to the user, also known as "force feedback." These types of interface devices can provide physical sensations which are felt by the user manipulating a user manipulable object of the interface device. For example, the Wingman Force joystick or the Wingman Force Feedback Mouse from Logitech Inc. may be connected to a computer and provides forces to a user of the controller. One or more motors or other actuators are used in the device and are connected to the controlling computer system. The computer system controls forces on the joystick in conjunction and coordinated with displayed events and interactions by sending control signals or commands to the actuators. The computer system can thus convey physical force sensations to the user in conjunction with other supplied feedback as the user is grasping or contacting the joystick or other object of the interface device. For example, when the user moves the manipulatable object and causes a displayed cursor to interact with a different displayed graphical object, the computer can issue a command that causes the actuator to output a force on the user object, conveying a feel sensation to the user.

Force feedback can be used to communicate ideas and messages as well as effects. Forces can in many instances provide additional information to a recipient of the message that may not be apparent in a text or voice message. For example, a text message sent to another user over the Internet may not include information indicating how strong the user feels about the topic expressed or other message subtext. Users can try to express this subtext using well-known icons or symbols known as "emoticons," which are iconic representations of emotions or messages, such as the "smiley" to indicate a humorous message, expressed as a colon and right parenthesis mark, :), which resembles a face smiling when viewed from the side. Variations of the smiley emoticon can express a variety of other emotions. However, such emoticons and symbols are limited in the complexity of the messages they convey and the range of different messages possible. Haptic feedback, in contrast, can offer much more complex and direct ways to express such subtext to other users in a more compelling fashion.

SUMMARY OF THE INVENTION

The present invention is directed to an interface allowing a user to exchange haptic chat messages with other users over a computer network. The user is able to provide messages that cause haptic sensations to one or more remote users which have a haptic interface device, allowing more diverse and compelling messages to be sent in a chat environment.

More particularly, one method of the present invention provides a chat interface displayed by a local computer, the chat interface capable of providing haptic messages to other users across a network. The chat interface is displayed on a display device of the local computer, and input data from a user of the local computer is received at the chat interface, the input data providing an outgoing chat message which can include sent force information. The outgoing chat message to be sent to a remote computer that is connected to the local host computer via a computer network, and the remote computer can display a chat interface and output a haptic sensation to a user of the remote computer based at least in part on the force information. An incoming message from the remote computer is received at the chat interface, which may also include received force information. The incoming chat message is displayed on a display device to the user of the local computer. A haptic sensation can be output to the user of the local computer using a haptic device coupled to the local computer, where the haptic sensation is based at least in part on the received force information received from the remote computer.

The local computer and remote computer can each be coupled to a server machine via the network, such as an IRC server, or can be coupled to each other via a peer-to-peer connection. The chat interface preferably includes multiple available haptic effects, each selectable by the user to be sent as the force information in the chat message. The chat interface also may allow the user to create a custom haptic sensation to be referenced by the force information sent to the remote computer. The force information is also preferably associated with sound information, such that the remote computer outputs a sound effect in coordination with the output of the haptic sensation. In one embodiment, the received force (or other) information can be processed by a background application running on the local computer simultaneously with the chat interface, the background application controlling the output of the haptic sensation to the user.

The sent force information may include a network address, which is then used by the chat interface on the remote computer as a network location at which to retrieve additional force information required to output a force sensation to the haptic device at the remote computer. For example, the network address can be an address of a web server storing a library of standard and customized haptic sensations which can be output by the haptic device. In addition, custom force information can be uploaded from a client machine to a server at the network address, where the uploaded custom force information can be downloaded by a different client computer to output a haptic sensation based on the custom force information. The force information in the chat message can alternatively includes data characterizing the desired haptic sensation. Preferably, the chat interface allows the user of the local computer to type a text command including text characters to be sent as a force command or cause force information to be sent to the remote computer. The text force command is preferably displayed in a chat interface of the remote computer and includes at least one delimiter character for indicating the nature of the text force command or can be a predetermined character(s), such as those used for emoticons. Chat messages can also be in audio or other formats, and one embodiment allows audio waveforms in chat messages to be analyzed to base haptic sensations on waveform content.

The present invention advantageously provides features in a chat interface on a computer to allow enhancements to chat messages using haptic sensations. The user can select a desired haptic sensation or even customize a haptic sensation to provide with a message to one or more other users in a chat session. The haptic sensations allow a wide variety of emotions and other content and subtext of messages to be conveyed, allowing a user more freedom to express a desired message across a computer network.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
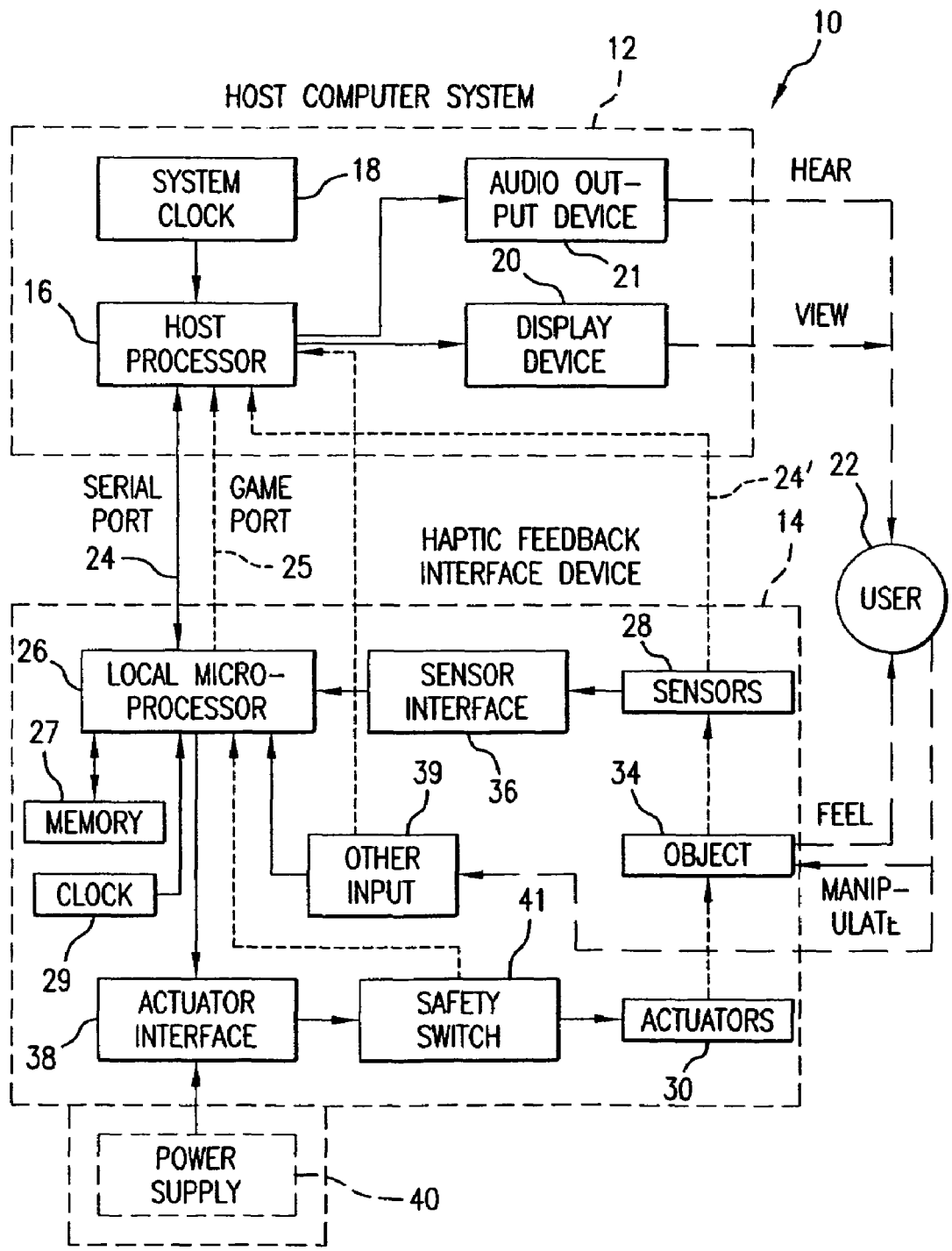
FIG. 1 is a block diagram illustrating a haptic system suitable for use as a client computer in the present invention.

FIG. 1 is a block diagram illustrating a force feedback interface system 10 for use with the present invention controlled by a host computer system. Interface system 10 includes a host computer system 12 and an interface device 14.

Host computer system 12 is preferably a personal computer, such as an IBM-compatible or Macintosh personal computer, or a workstation, such as a SUN or Silicon Graphics workstation. Alternatively, host computer system 12 can be one of a variety of home video game systems, such as systems available from Nintendo, Sega, or Sony, a television "set top box" or a "network computer", etc. Host computer system 12 preferably implements a host application program with which a user 22 is interacting via peripherals and interface device 14. For example, the host application program can be a video game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Display screen 20 can be used to display images generated by host computer system 12 or other computer systems, and can be a standard display screen, CRT, flat-panel display, 3-D goggles, or any other visual interface. Audio output device 21, such as speakers, is preferably coupled to host microprocessor 16 via amplifiers, filters, and other circuitry well known to those skilled in the art (e.g. in a sound card) and provides sound output to user 22 from the host computer 18. Other types of peripherals can also be coupled to host processor 16, such as storage devices (hard disk drive, CD ROM/DVD-ROM drive, floppy disk drive, etc.), printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bi-directional bus 24. The bi-directional bus sends signals in either direction between host computer system 12 and the interface device. An interface port of host computer system 12, such as an RS232 or Universal Serial Bus (USB) serial interface port, parallel port, game port, etc., connects bus 24 to host computer system 12.

Interface device 14 includes a local microprocessor 26, local memory 27, sensors 28, actuators 30, a user object 34, optional sensor interface 36, an optional actuator interface 38, and other optional input devices 39. Local microprocessor 26 is coupled to bus 24 and is considered local to interface device 14 and is dedicated to force feedback and sensor I/O of interface device 14. Microprocessor 26 can be provided with software instructions to wait for commands or requests from computer host 12, decode the command or request, and handle/control input and output signals according to the command or request. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer system 12 provides high level supervisory commands to microprocessor 26 over bus 24, and microprocessor 26 manages low level force control loops to sensors and actuators in accordance with the high level commands and independently of the host computer 18. The force feedback system thus provides a host control loop of information and a local control loop of information in a distributed control system. This operation is described in greater detail in U.S. Pat. No. 5,739,811 and patent application Ser. Nos. 08/877, 114 and 08/050,665 (which is a continuation of U.S. Pat. No. 5,734,373), all incorporated by reference herein. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data.

Sensors 28 sense the position, motion, and/or other characteristics of a user object 34 of the interface device 14 along one or more degrees of freedom and provide signals to microprocessor 26 including information representative of those characteristics. Rotary or linear optical encoders, potentiometers, optical sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12.

Actuators 30 transmit forces to user object 34 of the interface device 14 in one or more directions along one or more degrees of freedom, and/or may apply forces to the housing of the device 14, in response to signals received from microprocessor 26. Actuators 30 can include two types: active actuators and passive actuators. Active actuators include linear current control motors, stepper motors, pneumatic/hydraulic active actuators, a torquer (motor with limited angular range), a voice coil actuators, and other types of actuators that transmit a force to move an object. Passive actuators can also be used for actuators 30, such as magnetic particle brakes, friction brakes, or pneumatic/hydraulic passive actuators. Actuator interface 38 can be optionally connected between actuators 30 and microprocessor 26 to convert signals from microprocessor 26 into signals appropriate to drive actuators 30.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

User manipulable object 34 ("user object") is a physical object, device or article that may be grasped or otherwise contacted or controlled by a user and which is coupled to interface device 14. By "grasp", it is meant that users may physically contact the object in some fashion, such as by hand, with their fingertips, or even orally in the case of handicapped persons. The user 22 can manipulate or move the object to interface with the host application program the user is viewing on display screen 20. Object 34 can be a joystick, mouse, trackball, keyboard, stylus (e.g. at the end of a linkage), steering wheel, sphere, medical instrument (laparoscope, catheter, etc.), pool cue (e.g. moving the cue through actuated rollers), hand grip, knob, button, or other article.

The haptic feedback interface device 14 can take a variety of forms, including a mouse, joystick, gamepad, steering wheel, chair pads which the user sits on, fishing rod, pool cue, etc. A variety of these types of devices are available commercially. For example, suitable mice for use with the present invention include kinesthetic force and vibrotactile mice, such as those described in copending U.S. application Ser. Nos. 08/965,720, 09/125,711, 09/456,887, and 60/182,868, all incorporated herein by reference. The user object 34 and/or interface device 14 can also be a keyboard having haptic feedback functionality; some embodiments of such a keyboard are described in copending application no. 09/450,361, filed on May 12, 2000, and entitled, "Haptic Feedback Using a Keyboard Device," which is incorporated herein by reference. One preferred embodiment of a system for use with the present invention is a haptic keyboard and a haptic mouse, where the user may type messages on the haptic keyboard in the chat interface of the present invention, and may use the haptic mouse to move a cursor to select functions within the chat interface. Both devices can output the haptic feedback communicated in the present invention. Thus, when using both devices, the user can experience the haptic feedback at all times, whether the user has one hand on the keyboard and one hand on the mouse, both hands on the keyboard or one hand on the mouse, or no hands on the keyboard and one hand on the mouse.

Haptic Feedback Chat Interface

Figure 2:
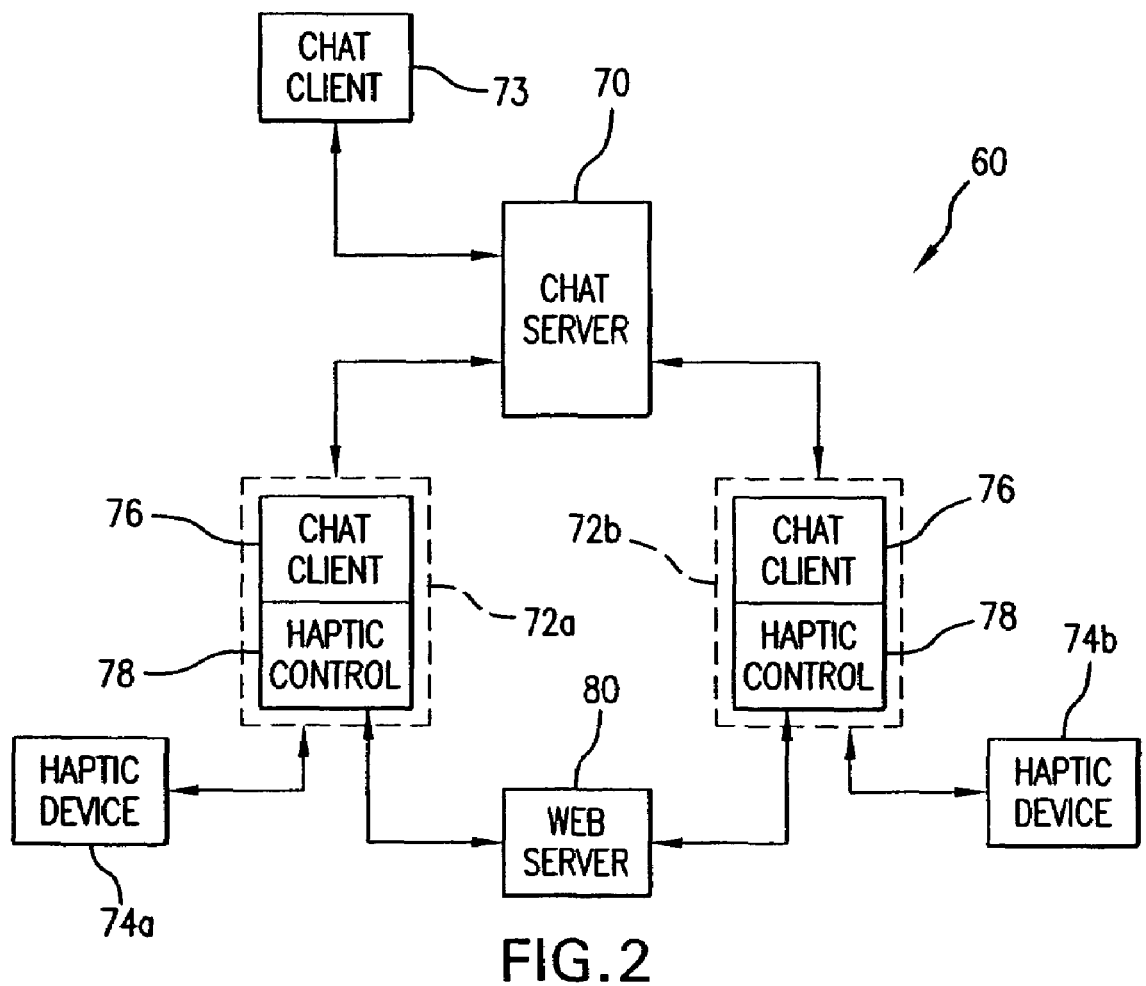
FIG. 2 is a block diagram illustrating a network configuration suitable for use with the present invention.

FIG. 2 is a block diagram illustrating a computer networking structure 60 suitable for use with the present invention. A chat server machine 70 can be provided which can implement a chat communication program and/or protocol, such as IRC, as is well known to those of skill in the art. The server can be available over the Internet and/or World Wide Web, for example, or on a LAN, WAN, or other network (including a wireless network, device network, telephone network, etc.). Client machines 72a and 72b can connect to and communicate with the server over the network. Each client machine 72 is coupled to a haptic device 74 that outputs haptic sensations to the user as detailed above and which is physically contacted and operated by the user of the client machine. The client machines 72a, 72b and 73 can connect to the server, and through the server the client machines can establish a connection with each other. In a chat, the user of each client machine sends data to one or more of the other client machines, where it is read and sensed by the other user. The chat server 70 can be used merely as a way for two client machines to find each other and connect, so that communication between client machines is thereafter only between themselves; or, the chat server 70 can continue to receive and route data between the clients. In other embodiments, client machines can directly connect to each other in a peer-to-peer connection, without the use of a separate server machine, over various types of networks, connections, and channels. The term "network," as used herein, is intended to refer to all such communication connections.

In the described implementation, clients 72a and 72b each include a chat client functional portion 76 and a haptic control functional portion 78. The chat client 76 interacts with the chat server 70 according to standard protocols to provide chat communications to the user of the client machine from other client machines. For example, server 70 can be an IRC (Internet Relay Chat) server which communicates with clients using well-known IRC protocols. Other types chat protocols that can be used include pure HTML-based chat protocols, Java-based chat protocols, or protocols based in other standards. Some clients connected to server 70 and participating in chat sessions, such as client 73, may only be implementing the chat client portion 76 and thus ignore the haptic implementation of haptic messages.

The haptic control portion 78 interacts with the chat client portion 76 to provide control over haptic sensations of the present invention that are associated with chat messages. For example, received messages which are interpreted as haptic messages or commands can be detected by the haptic control portion 76 and haptic sensations can be commanded from portion 78 to the haptic device 74. Furthermore, in some embodiments, the haptic control portion 78 can communicate with one or more other servers, such as web server 80. For example, force effect data, sound data, or other data can be retrieved by the haptic control portion 78 to implement particular haptic sensations. This operation is described in greater detail below.

Figure 3A:
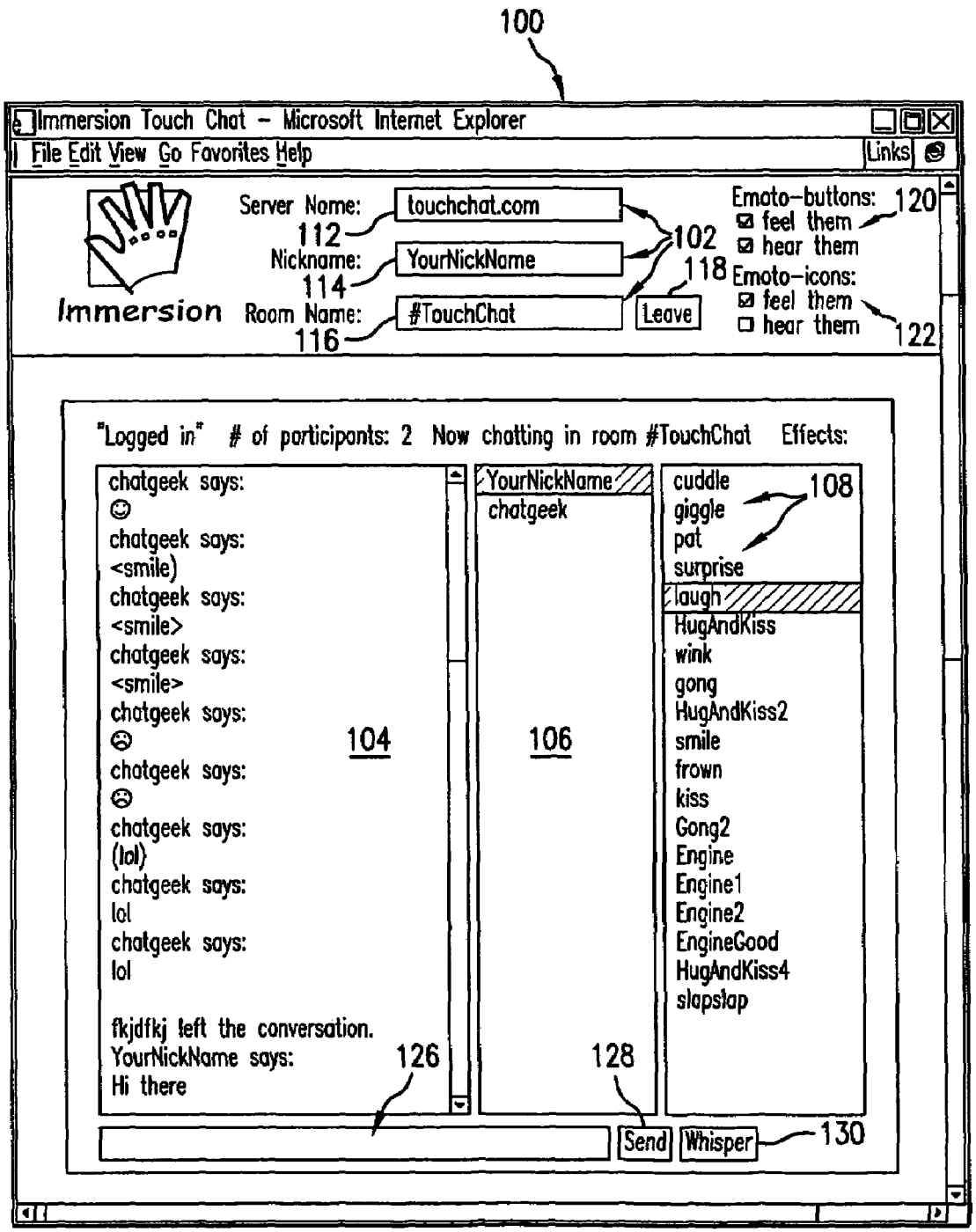
FIG. 3a is a screen display of one embodiment of a chat interface of the present invention allowing haptic messages to be sent and received.

FIG. 3a is a diagram of display screen 20 of host computer 12 showing a displayed interface 100 illustrating one example of a chat interface for a network chat application program of the present invention. A network chat program allows two or more people at different computers or terminals to communicate with each other over a computer network, as is well known to those skilled in the art. In some embodiments, a single person can interact with a "simulated person" or entity in a chat-like communication, such as with a AI game character or player implemented by a program running on a server, which can also make use of the present invention. In different embodiments, messages in different formats can be sent, such as in text, sound, images, or a combination of these. The chat interface of the present invention also allows haptic sensations to be sent from one user to one or more other users across the network based on the message desired to be sent. Some methods for providing haptic feedback over a network are described in U.S. Pat. No. 6,028,593 and U.S. patent application Ser. No. 09/153,781, both incorporated herein by reference. The network can be a local area network (LAN), wide area network (WAN), the Internet, or other network.

Display screen 20 is shown displaying a chat interface 100 of the present invention. The interface 100 can implement and connect to a server running a standard chat program and protocol, such as Internet Relay Chat (IRC), using methods well known to those skilled in the art. IRC simply provides text characters from one client to the chat server 70, which routes the text characters to the other clients participating in the chat session. In some embodiments, the chat protocol used can be a proprietary one that only functions with particular programs.

In the described embodiment, a chat client program handles all the standard chat interfacing, while a haptic functionality program interfaces with the chat program to handle the output of haptic sensations. For example, the chat interface 100 can be displayed within a web browser program, such as Microsoft Internet Explorer or Netscape Navigator, as a web page. For example, in one implementation, the Internet Explorer web browser can make use of the MS Chat ActiveX Control available from Microsoft Corp., which can perform all the functions necessary to communicate with an IRC server and the necessary network protocols; this can be the chat client portion 76 as shown in FIG. 2. The ActiveX Control can generate events, such as when message data is received, to allow other programs to act upon those events. The haptic control portion 78 can be running alongside the chat ActiveX Control and can receive the events from the control. When an event occurs, the haptic control portion can check the input for specific haptic commands or messages and generate commands to cause haptic sensations for the user if appropriate.

Alternatively, the chat interface 100 can be implemented as a separate application program, as a functional part of another program or operating system, a Java applet or other program implemented over the World Wide Web or Internet, or other implementation. Similar embodiments used for force feedback in web pages sent over the World Wide Web are described in copending application Ser. No. 09/244,622, incorporated herein by reference. For example, in one embodiment the haptic chat interface can be a portion of an "instant messaging" program such as ICQ or AOL Instant Messenger, available from America Online, Inc., which allows users to chat using text, send files to each other, connect to each other using a game program, etc. In a different embodiment, a background application, which is always running on the client computer, checks all input being sent and/or received and determines if any of the input qualifies as a haptic message, e.g. if any input has the brackets surround text characters as described below. Thus, a standard chat interface program can be used for providing chat functionality, with the background application enabling the haptic sensations for haptic messages. If such a background application is used, particular application programs, such as chat programs and instant messaging programs, can be designated by the user to be monitored by the background application, so that the background application ignores input and output of other programs not relevant to haptic messaging. A background application used for force feedback functionality in a graphical user interface, which can also be applied to the chat interface of the present invention, is described in copending U.S. patent application Ser. No. 08/970,953, incorporated herein by reference.

In still other embodiments, the interface 100 can portray a 2-D or 3-D graphical environment through which the user can navigate and manipulate. For example, in a virtual or game environment implemented over the Internet or other network (e.g., using VRML protocols), a message can be sent to another 3-D character or avatar, and a haptic component to the message can be provided for the recipient.

Interface 100 includes information fields 102, chat window 104, a user list window 106, and effects window 108. Information fields 102 allow the user to specify connection and naming options. A server name field 112 allows the user to specify a particular server to which to connect. For example, the described implementation allows the user to connect to IRC servers. Alternatively, this can be a client name to connect directly to another client machine, if such functionality is provided in the chat interface. Nickname field 114 allows the user to specify a name that is used within a chat. Room name field 116 allows the user to specify a "chat room" or particular area on the specified server in which the chat is held which allows only the users designated to be in that chat room to communicate with each other in the chat session. The "leave" button 118, when selected by the user (e.g. with keyboard or mouse cursor), causes the user to leave any chat session in which the user is currently participating. Attributes 120 allow the user to designate whether the user will feel the haptic sensations associated with an effect from window 108 when such an effect is received from another user, and/or hear the sound effect associated with that haptic message when it is received (or, in some embodiments, when the haptic or sound effect is sent by the user, to allow the user to haptically and auditorily experience a message in the way that the recipient of the message will experience it). Icon attributes 122 allow the user to designate whether the user will feel the haptic sensations and/or the sound effects associated with "icons" (emoticons) received from a different user, i.e. messages having haptic and auditory content when used in the present invention, each message represented by a single command or icon. For example, a smiley icon (":)") can, when received, cause a predefined force sensation and sound to be output to the user if attributes 122 are selected. The user can therefore select whether he or she wants to experience the haptic and/or auditory content of iconic messages received in the chat interface 100.

Chat window 104 displays the text messages typed in (or otherwise input) by the user as well as messages sent from other users that are currently connected to the user's computer in a chat session. The user can type in a text message in the text entry field 126, can send the message to all the users in the chat session by selecting button 128, or can "whisper" the message only to users selected in window 106 by selecting the button 130. In other implementations, each of the users in the chat session may display messages in a separate window or other area of the interface 100 dedicated to that user. User list window 106 displays all the users currently in the chat room or session in which the user is participating or observing (e.g., in a chat room which the user wishes to observe without sending messages of his or her own). The users participating in the chat room are able to type messages to the other users in the chat room, where those messages are displayed in the chat window 104. In some embodiments, a user is able to select one or more names of users displayed in window 106 to call up information about those users and/or send messages directly to those users. In the preferred embodiment, the user can select one or more names and send tactile messages to the selected users.

Effects list 108 provides a number of force effects that can be sent as haptic messages to a particular users selected in the user list window 106 (or to all users if no users in list 106 are selected). Each of the effects listed in list 108 also has one or more sounds associated with it which are played by the recipient's client machine when the haptic message is sent. Effects list 108 preferably includes all the haptic messages which the user can send, including any custom or newly-downloaded messages. The messages are only sent to the selected user(s), so that other unselected users are not sent the messages. Each name in list 108 represents a particular haptic sensation that has been associated with that name or label in list 108. To send a haptic message, the user can select one of the effects in list 108 with a displayed cursor or by using some other selection method (keyboard, etc.). This preferably calls up a menu to allow the user to perform different functions with the selected effect, as detailed below with respect to FIG. 3b. The list 108 preferably can be scrolled or otherwise navigated if it includes too many entries to be displayed all at one time.

Figure 3B:
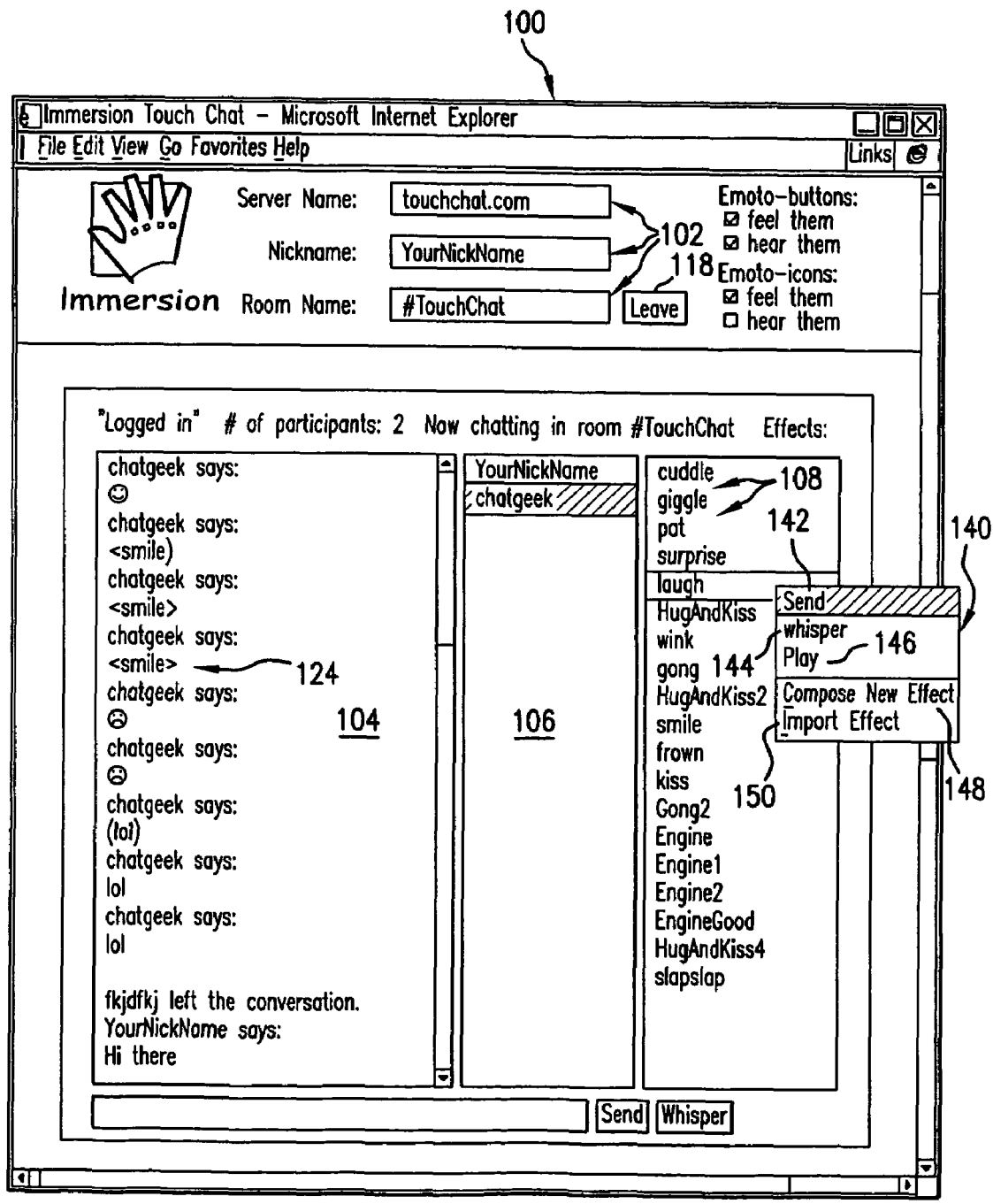
FIG. 3b is a screen display of the chat interface of FIG. 3a in which a haptic effect is selected to be sent as a haptic message.

FIG. 3b shows the displayed interface 100 of FIG. 3a, where the user has selected one of the effects in list 108 to display an options menu 140. For example, the user can use a mouse or other pointing device to move the cursor on the desired effect and push a particular mouse button to bring up the menu 140. Menu 140 includes a number of options, including a send command 142, a whisper command 144, a play command 146, a compose new effect command 148, and an import effect command 150. The user may select any of these commands.

The interface 100 of FIG. 3b shows the send command 142 selected. This command will cause the selected effect in list 108 to be sent to the all users participating in the chat, i.e. users in the chat room. For example, the "laugh" effect shown selected in FIG. 3b is sent to all participants in the chat session. In the described embodiment, this is implemented by sending text characters that are designated or delimited as a haptic command by other text characters. For example, characters that are surround by brackets <and> can be interpreted as haptic commands by the haptic control portion of the interface 100. Thus, the command <laugh> is sent to the other clients when the "laugh" effect is sent using the menu 140. Preferably, the command label generally signifies in natural language the haptic sensation with which it is associated; e.g., the command "slap" signifies a high magnitude jolt, while the command "wink" may signify a lower magnitude sensation.

The haptic control portion of the recipient user's client detects the received command and outputs a force sensation with the same name to the haptic device. Thus, for example, when the effect "pat" is selected (or the command <pat> is entered), an associated haptic message is sent to other chat user(s). The recipient user(s) then feel the haptic message via a haptic feedback interface device that the recipient user is using. The haptic message is delivered to the recipient user as a haptic sensation output by the recipient user's haptic interface device, e.g. a pulse, vibration, jolt, etc. or combination of multiple haptic sensations. Each of the effects in list 108 preferably has a name or label that is appropriate to the haptic sensation associated with that name. For example, the "pat" effect preferably provides a haptic message implementing a small, smooth jolt to the grip or user object of the recipient user's haptic device, like a pat of a hand. The "giggle" effect can provide a low-frequency vibration, the "slap" effect can provide a sharp, high magnitude jolt, the "smile" effect can provide a slow side-to-side motion, etc.

Also, a predefined sound effect is also preferably associated with the sent message to more effectively convey the message, although such sound need not be played in alternate embodiments. The sound effect is synchronized with features of the haptic sensation of the haptic message. For example, the message "slap" can provide a single haptic jolt and sound effect, while the message "slap-slap" can provide two successive jolts, each jolt synchronized with appropriate slapping sound effects. A sound file (which can be in a standardized format such as .wav) can be associated with the haptic command on the recipient client machine, and this sound file is played concurrently with the output of the force sensation. In other embodiments, other types of media data can be output synchronized with the haptic effect instead of or in addition to the sound effect. For example, animated or static graphics or images can be displayed on a display screen in coordination with the output of the haptic effect and with the sound effect. These other types of data can be stored in files and accessed similar to the sound files described above.

A chat user can also preferably send a haptic message by typing a text command in the chat window directly with a keyboard (or inputting the command with another input device) rather than selecting an effect from the list 108. For example, the user could simply type "<slapslap>" to cause the appropriate haptic message to be sent. Furthermore, predefined "emoticons" can be defined to be associated with haptic and sound effects and can be sent as haptic commands. For example, a smiley emoticon, ":)", when typed into entry field 126 and sent to another user, can cause the same haptic sensation as a "smile" effect selected from effects list 108, or can cause a unique associated haptic sensation to be output to the recipient. Other examples of emoticons include ": (" (frown), ";)" (wink), and ": o" (surprise). In some embodiments, to be used as haptic messages, such emoticons are placed between brackets to indicate that they are haptic commands. Other embodiments can automatically interpret such emoticons as commands, without brackets or other command characters or delimiters. Emoticons can preferably be predefined by a user in a separate list, where each emoticon can be associated with haptic effects and sound effects similarly to the custom effects described below.

In the described embodiment, the command sent to the recipient clients as a haptic message is also displayed in the recipients' chat window 104 (and the sender's window 104, if desired) as the text characters in the message. Thus, a "smile" haptic message 124 is displayed in FIG. 3b which caused a haptic sensation and associated sound to be output on the recipient's client machine. The displayed message 124 indicates visually to the user that a haptic message has been sent.

In some embodiments, the user can send a normal text message as well as a haptic effect and sound effect, all simultaneously. For example, the user can type in a message in field 126 and can select an option (not shown) in menu 140 such as "send with text message", which will cause the selected haptic effect (and associated sound effect) to be simultaneously sent with the text message in field 126 to recipient users. Thus, the term "haptic message" as referenced herein can include a haptic effect as well as a sound effect, a text message, and/or other content.

The whisper command 144 in menu 140, when selected, causes the selected haptic effect(s) from list 108 to be sent only to those users selected in window 106, but is otherwise similar to the send command 142. The play command 146 allows the selected haptic effect(s), and their associated sounds, to be output on the user's own client machine so that the user can check how the haptic message will be experienced by recipient users.

The actual haptic message contents that are sent to the recipient client machine(s) can vary in different embodiments. In the described embodiment, the available haptic messages from list 108 are identical for all users in the chat, who are all using the same interface 100. Thus, the only information that needs to be sent to other users in a haptic message is the high level command indicating the type of haptic sensation is being sent as a message, such as the text label of the effect surround by brackets explained above, or some other type of command. This allows the chat interface of the recipient client machine to receive the command as standard text characters or other standardized data, and allows the haptic control portion of the recipient client machine to know which haptic sensation should be output. It should be noted that in some embodiments, a haptic message can be sent without the sending client knowing that it is a haptic message. For example, as explained above, an emoticon without any other special characters can be sent by a non-force feedback standard client in a chat session as a text message, and the emoticon can be considered a haptic message by the receiving client so that a haptic sensation associated with the emoticon is output upon reception. Such an implementation can be considered a "generic" haptic effect that is implemented only at the receiving client.

In other embodiments, more sophisticated haptic messages can be sent or indicated. For example, the haptic message can include force information content and/or additional commands that are sent to the recipient user's client machine and instruct the haptic device of the recipient user to output a haptic sensation. This can allow for customized haptic sensations to be output that are not previously defined within the interface 100. The force information can be provided in several different ways. For example, the force information can be sent as a high level command that indicates a standardized type of haptic sensation to output, where it is assumed that the recipient users all have a standardized library of haptic sensations available on their computer systems which the high level command can reference. In some embodiments, additional information can be sent, such as one or more command parameters that characterize the commanded haptic sensation, e.g., time duration of the sensation, frequency, magnitude, direction, button parameters, rise time and decay time, simulated mass or position, etc. In yet other embodiments, data describing and defining the actual haptic sensation can be sent over, such as a series of force magnitudes and directions. Or, a network address (or other location) can be sent at which the haptic sensation data can be downloaded or retrieved. Many of these methods can allow completely customized haptic sensations to be sent which recipient users do not already have. For example, the first time a customized haptic message is sent, all the data required to implement the haptic sensation is also sent. Any description data need not be sent thereafter when that haptic message is sent successive later times, since the haptic description data is already resident and saved on the recipient computer system. Such sending of description data is obviously more suitable for communication over faster, broadband networks and connections due to the larger amount of data sent.

Figure 3C:
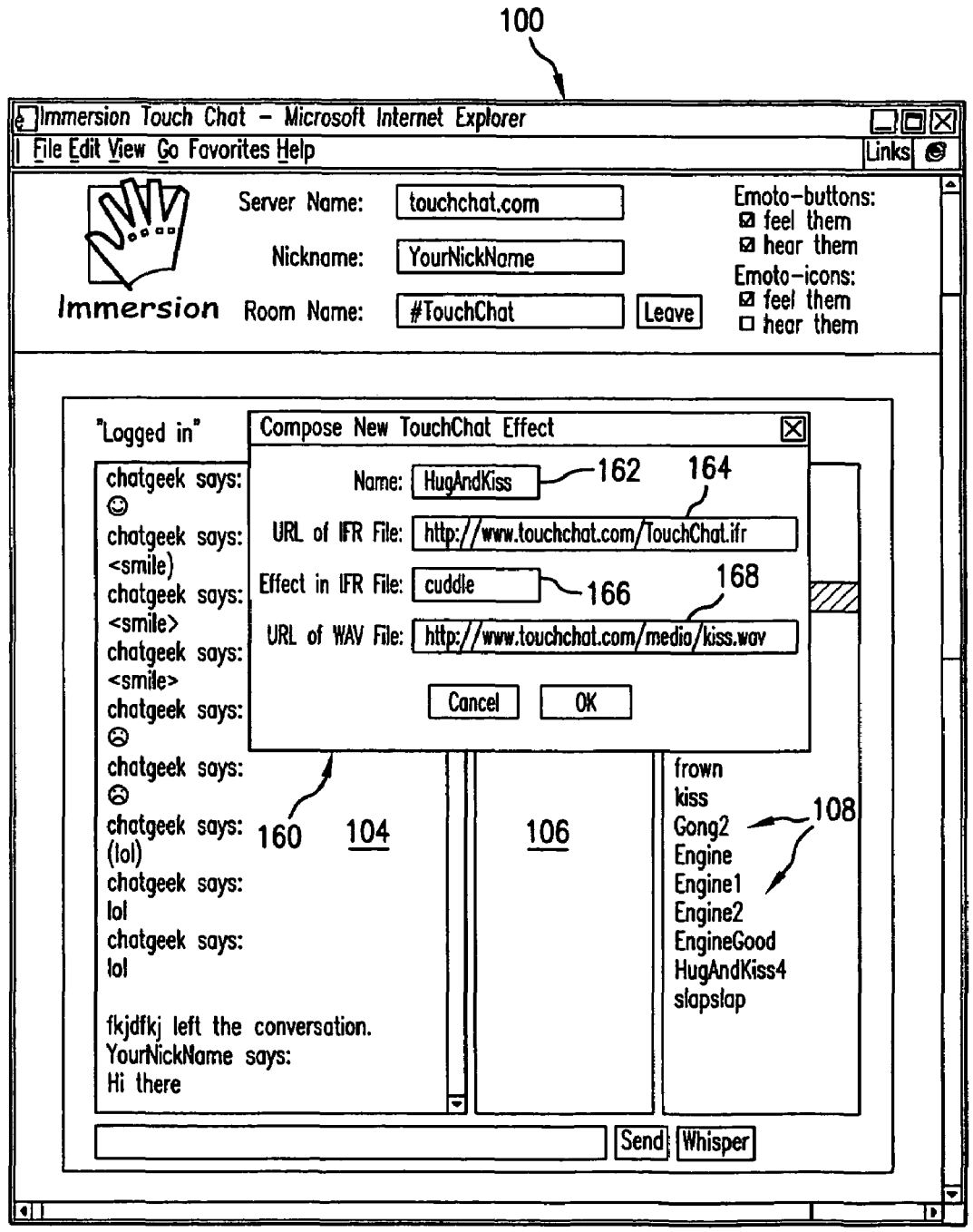
FIG. 3c is a screen display of an input screen of the chat interface of FIG. 3a to allow the user to specify information about a custom haptic effect.

Custom haptic effects and sound effects can also be composed by users. For example, if the user selects the Compose New Effect command 148 from menu 140, the user preferably accesses a user interface to allow effect creation. One example of such a user interface is shown in FIG. 3c. A dialog box 160 is displayed when the user has selected command 148. The user can enter information into fields of the dialog box to define a custom haptic effect and sound effect. For example, a name or label for the haptic message can be specified in field 162, a network address or local address for the location of the haptic effect associated with the label (where the data can be organized in a file having a standardized format, such as an ".IFR" file) can be specified in a field 164, the name of the haptic effect file at the address of field 164 can be specified in field 166, and the network or local address of sound data, such as a sound file, can be specified in field 168. Once the user has entered this data to create a new haptic message, the name of field 162 is displayed in the list 108 of the chat interface 100 and can be selected similarly to the other listed effects.

In some embodiments, libraries of standardized as well as customized haptic effects and sound effects can be stored on network servers available on a network having wide distribution, such as the Internet, which recipient users can access to download the needed data to experience received haptic messages. In the described embodiment, web server 80 (shown in FIG. 2) can be accessed by the haptic control portion of the chat program of the present invention (e.g. by using a URL address and CGI script) to download needed haptic effects and/or data, as well as sound data. For example, a sending user can create a custom haptic effect on his or her client machine using the interface of FIG. 3c. At the time of effect creation, or when the creating user enters a chat room, or if/when that user so chooses, the custom haptic effect is uploaded to the web server 80 to be stored and made available to other clients accessing the network. Other users on different client machines, when entering the chat room or after the time when the custom effect has been uploaded, can automatically download the custom haptic effect from the web server 80, or can download the custom effect when the user of that machine so chooses. For example, upon entering a chat session, the chat interface on each client machine can check which haptic effects are needed for the chat session; this can be accomplished by maintaining a continuously-updated "chat room list" of effects on the web server, which includes all effects which could be sent from any of the client machines in the chat room. A particular chat interface can check that list upon entry into the chat session, and then download the effects in the list not currently stored on that client machine. Alternatively, when a haptic message referencing the custom effect is sent to a client machine, the recipient client machine can download the data for that effect at the time of reception of the haptic message.

Figure 3D:
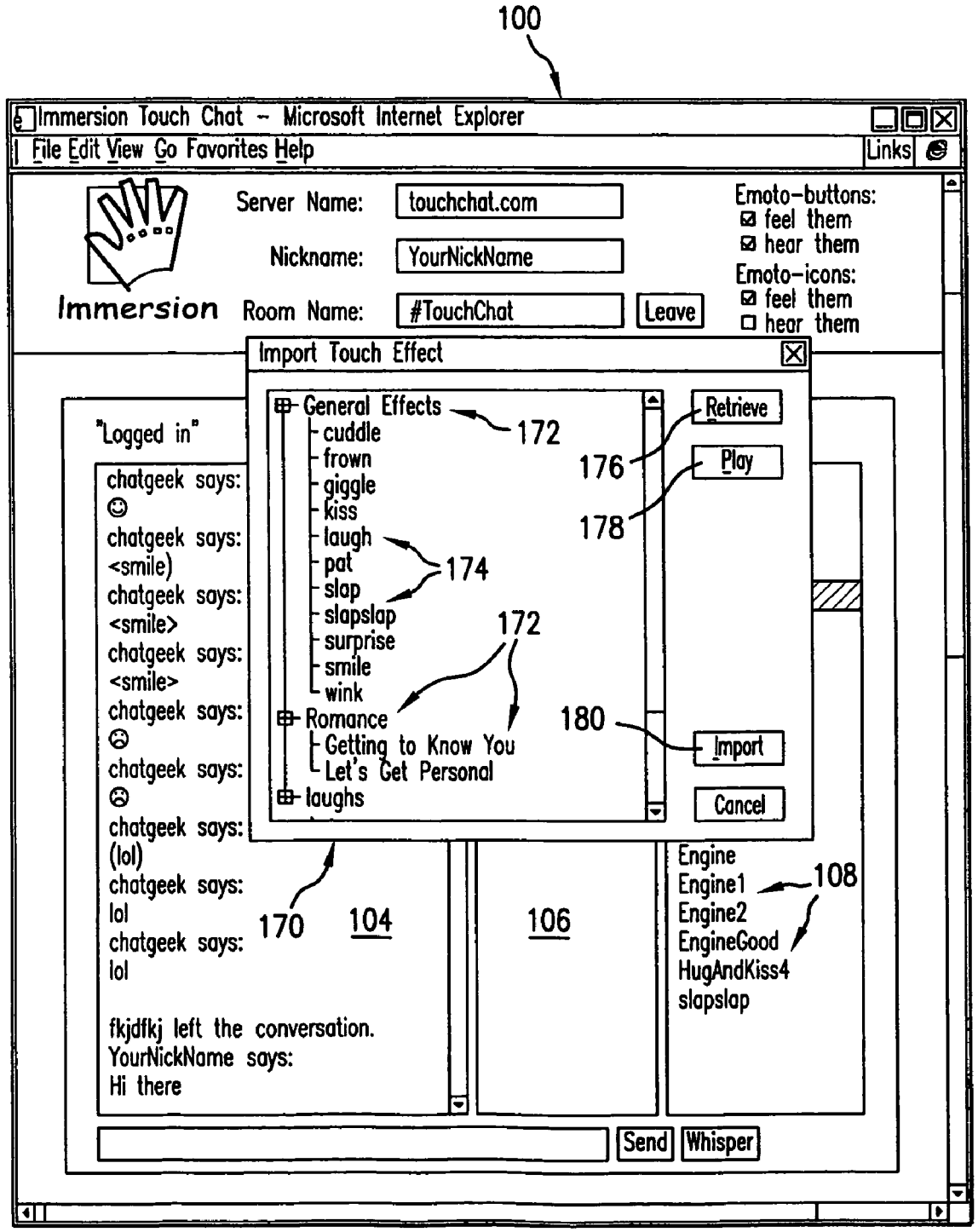
FIG. 3d is a screen display of a selection screen of the chat interface of FIG. 3a to allow a user to retrieve and test a haptic effect from a list stored on a different server.

The chat interface 100 (or other separate program or web page) can include features to allow users to connect to a server that lists customized haptic sensations available from multiple other users that have chosen to make their sensations available, and which allows users to connect to various other user client machines or servers to download selected haptic sensation files and data. For example, if the user selects the Import Effect command 150 of the menu 148, the user can preferably import any of several available effects. An example of an interface to allow such selection in shown in FIG. 3d. Window 170 shows a library list stored on a web server (or other server) that includes a number of categories and subcategories 172 of effects available on the server. In each category or subcategory 172, a number of effects 174 can be listed which are stored on the server. Effects which are not currently stored on the client machine displaying the interface 100 can be designated or marked as such. The user can select an effect 174 and then select the retrieve button 176 to download the selected effect to the local client machine. The user can also select the play button 178 to play a selected, retrieved effect 174, allowing the user to experience how the effect feels. If the user selects the import button 180, a selected effect is added to and displayed in the list 108 of effects (and downloaded if necessary) and can be sent by the user as a haptic message, as well as played when the user receives a haptic message including that haptic effect. Any sound effects associated with the retrieved haptic effect are also preferably downloaded.

The effects can be categorized on the server according to a number of different criteria. For example, groups of haptic messages can be displayed and organized according to types of messages, emotion of the message, strength of the message, etc. For example, a "sad messages" category can include all those haptic messages conveying such an emotional state, and a "romance" category can include haptic messages conveying an appropriate close, personal message.

In other embodiments, the chat interface can be part of a voice communication program allowing voice communication or telephony over the computer network 60. Voice communication features can be found in existing utility programs or in API's such as DirectX. For example, when saying something to a recipient user, a sending user can select a message effect similar to an effect in list 108 to provide a haptic sensation to the recipient user in conjunction with the spoken message, or independent of any speech. Haptic messages can also be selected to be sent to a recipient user based on spoken message occurrences or content; for example, a haptic message can be sent each time a word is spoken. If voice recognition is implemented on the client machine (e.g., using standard available voice recognition software), a haptic message can be based on a software interpretation of the actual spoken message content. Thus, if the user says, "I hate you" to another user, a "slap" or "punch" message can automatically be sent with or right after the voice message to provide the appropriate haptic sensation.

A haptic message can be "generic," i.e. the haptic output can be generated on the receiving machine based on user preferences, where the user can associate desired haptic sensations with particular commands that are received in an appropriate interface. Alternatively, a haptic message can be "authored", where the sending user defines how the haptic sensation is to be felt within the message, by pointing to standardized haptic sensations or providing the data necessary to implement the authored haptic sensation. Such generic and authored implementations are similar to generic and authored force effects sent over networks as described in copending U.S. application Ser. No. 09/244,622.

In another embodiment, haptic sensations can be based on audio speech that is input and transmitted as chat messages to be output by the other client machines in the chat session. In one such embodiment, a process can be running on the receiving client computer which analyzes incoming audio speech data and commands haptic sensations based on the speech data. For example, in a simple embodiment, a wave pattern representing the speech data can be converted to haptic sensations based on the shape of the waveform, where each (or a selected) peak in the waveform can cause the output of a pulse or jolt on the haptic device, and repeating peaks in the waveform can cause a vibration. Other features of waveforms can be designated for other haptic effects, e.g., jumps in amplitude by a predetermined amount can cause a jolt or pulse, or the jolt's magnitude can be proportional to the jump in amplitude of the waveform.

In a more complex embodiment, the speech waveforms of the received message can be analyzed for predetermined, particular characteristics which may indicate the emotional content of the audio chat message, and a haptic sensation appropriate to the emotional content can then be output to the user. For example, a laugh of the sending user might provide distinguishing characteristics in the sent waveform, such as a high frequency, high amplitude oscillation. If such a laugh is detected, a haptic sensation such as an oscillation or wiggling of the mouse (or other user manipulandum) can be output. A shout from the sending user might appear in the waveform as a quick transition from low amplitude to high amplitude, and the associated haptic sensation can be a quick, high frequency vibration or pulse. A sigh from the sending user may cause a long, low frequency, low volume, consistent pitch or amplitude in the waveform, which can be associated with gentle, circular motions of the manipulandum or low frequency vibrations on the haptic device. Other emotions or inherent messages can be similarly analyzed in received waveforms and appropriate haptic sensations output based on the analysis.

Figure 4:
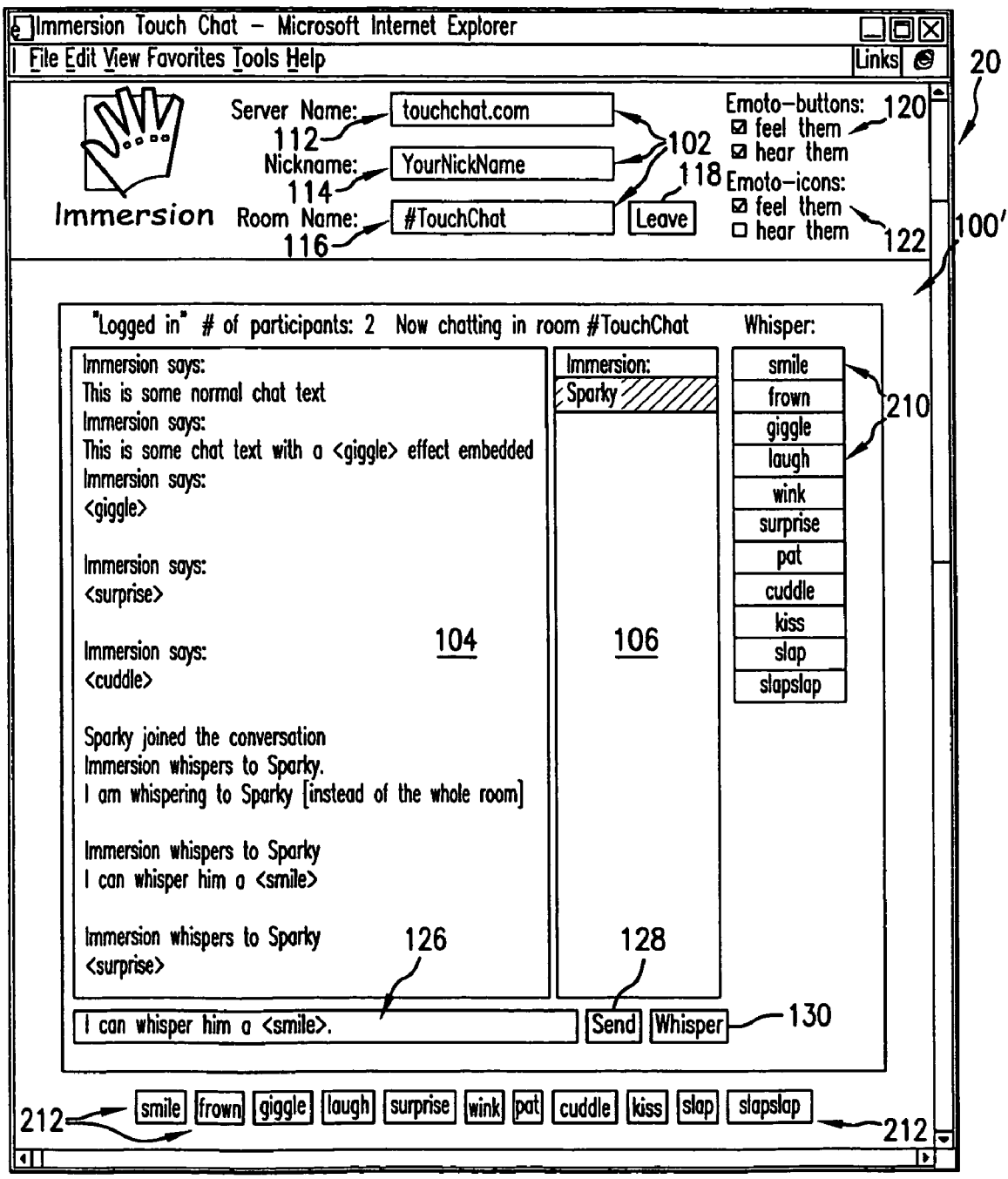
FIG. 4 is a screen display of another embodiment of the chat interface of FIG. 3b including buttons used to send haptic messages.

FIG. 4 illustrates a slightly different embodiment 100' of a chat interface, similar to the chat interface 100 shown in FIG. 3a. Interface 100' is different from interface 100 in that several haptic message buttons are provided instead of the list 108 of effects. Whisper haptic message buttons 210 are used to send haptic and auditory messages to particular users selected in the user list window 106. The messages are only sent to users selected in the window 106. Each button 210 represents a particular haptic sensation that has been associated with the name of the button, similar to an effect listed in list 108 described above. To send a haptic message, the user merely selects one of the buttons 210 with a displayed cursor or by using some other selection method (keyboard, voice, etc.). Thus, when the button "pat" is selected, an associated haptic message is sent to the selected user(s). The selected user(s) then feel the haptic message via a haptic feedback interface device that the selected user is using. General haptic sensation message buttons 212 are similar to whisper buttons 210, except that the haptic message designated by the button label is sent to all users in the chat session instead of selected users.

While this invention has been described in terms of several preferred embodiments, it is contemplated that alterations, permutations and equivalents thereof will become apparent to those skilled in the art upon a reading of the specification and study of the drawings. For example, many different application programs can use the messaging functions of the present invention, including game programs, virtual reality programs and environments, teleconferencing applications for business meetings, telephone-type voice communications over computer networks or other communication channels, etc. Furthermore, certain terminology has been used for the purposes of descriptive clarity, and not to limit the present invention. It is therefore intended that the following appended claims include all such alterations, permutations, and equivalents as fall within the true spirit and scope of the present invention.

The invention claimed is:

1. A method, comprising:
   receiving a connection from a remote client device;
   receiving a selection of at least one haptic effect from the remote client device;
   transmitting the at least one haptic effect to the remote client device;
   receiving a message from a second device; and
   transmitting the message to the remote client device, the message including a parameter configured to cause the remote client device to output the at least one haptic effect.

2. The method of claim 1, wherein the remote client device comprises a wireless device.

3. The method of claim 1, wherein the at least one haptic effect comprises a haptic effect and a sound.

4. The method of claim 1, further comprising storing the at least one haptic effect on the local client device.

5. The method of claim 1, wherein the message comprises text information.

6. A system, comprising:
   a first device in communication with a network and comprising an actuator, the first device configured to:
   receive a selection from a second device of at least one haptic effect;
   transmit the at least one haptic effect from the first device to the second device based at least in part on the selection,
   receive a message from a third device, and
   transmit the message to the second device, the message including a parameter configured to cause the second device to output the at least one haptic effect.

7. The system of claim 6, wherein the remote client device comprises a wireless device.

8. The system of claim 6, wherein the at least one haptic effect comprises a haptic effect and a sound.

9. The system of claim 6, wherein the remote client device is further configured to store the copy of the at least one haptic effect.

10. The system of claim 6, wherein the message comprises text information.

11. A computer-readable medium comprising program code, the program code comprising:
    program code for connecting to a first device from a local client device;
    program code for selecting at least one haptic effect from the first device;
    program code for receiving the at least one haptic effect from the first device;
    program code for receiving a message from a remote device; and
    program code for outputting the at least one haptic effect to the local client device based at least in part on the message.

12. The computer-readable medium of claim 11, wherein the at least one haptic effect comprises a haptic effect and a sound.

13. The computer-readable medium of claim 11, further comprising program code for storing the at least one haptic effect on the local client device.

14. The computer-readable medium of claim 11, wherein the local client device comprises a wireless device.

15. The computer-readable medium of claim 11, wherein the at least one haptic effect comprises a haptic effect and a sound.

16. The computer-readable medium of claim 11, wherein the message comprises text information.

* * * * *